Sept. 30, 1958 B. F. PARR 2,853,936
TOASTER APPARATUS
Filed Dec. 18, 1956
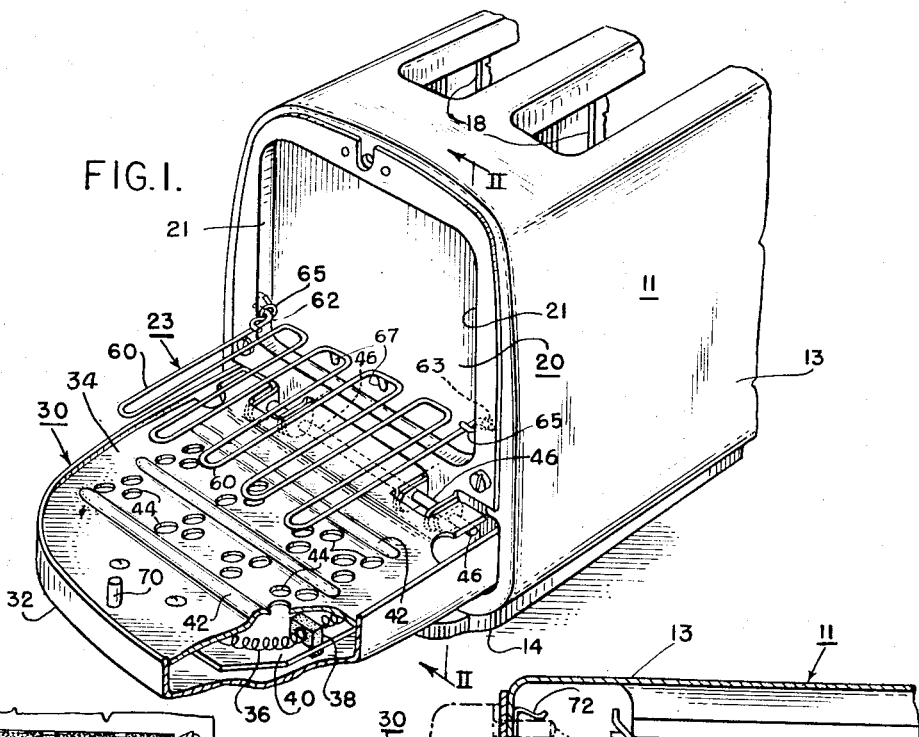
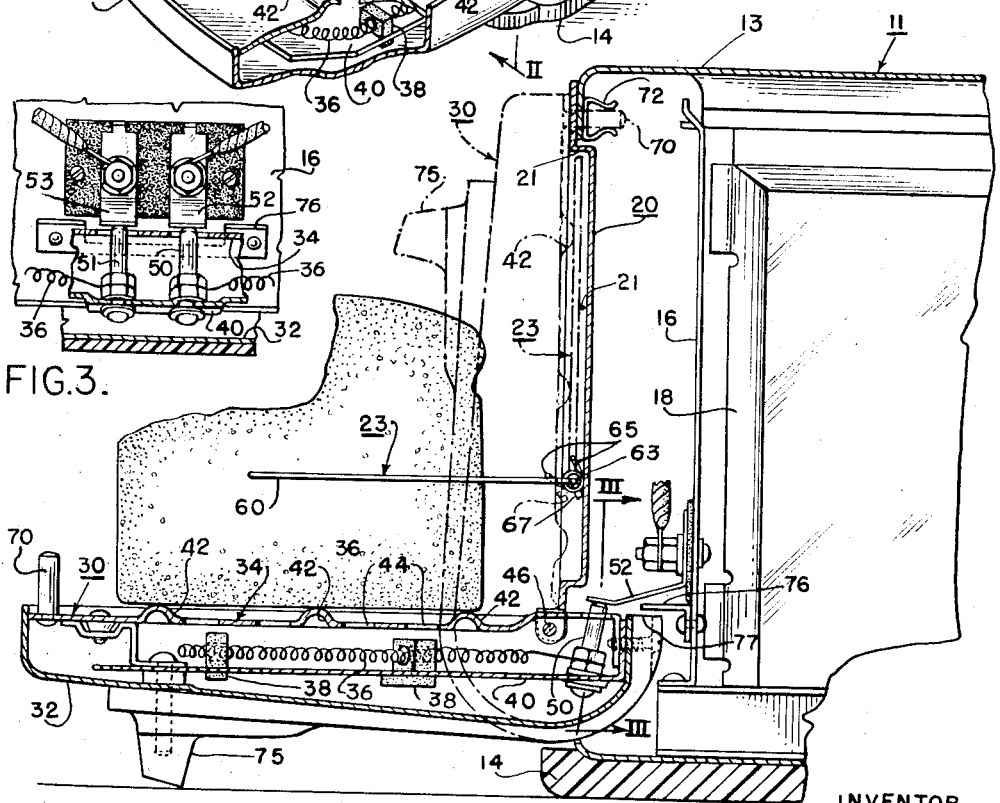
INVENTOR
BERNARD F. PARR
BY M. C. Freudenberg
ATTORNEY

United States Patent Office 2,853,936
Patented Sept. 30, 1958

2,853,936
TOASTER APPARATUS

Bernard F. Parr, Mansfield, Ohio, assignor to Westinghouse Electric Corporation, East Pittsburgh, Pa., a corporation of Pennsylvania Application December 18, 1956, Serial No. 629,036

7 Claims. (Cl. 99—339)

This invention relates to a toast support and warming device for maintaining toasted bread slices warm after they are removed from toasting chambers within a toaster. More particularly, it pertains to such an arrangement constructed as part of the toaster.

Most conventional toasters are provided with a plurality of toasting chambers for toasting bread slices. Usually the toasting capacity of the toaster is two slices of bread at one time. Many individuals wish to prepare more than two toasted slices prior to eating them, but are confronted with the problem of the toasted slices cooling very rapidly after they are removed from the toasting chambers. It is very desirable that a toaster be provided with some type of auxiliary heating means for maintaining toast warm after it is removed from the toasting chamber, not only to keep the toast easier to butter and more pleasing to the taste, but also to free the toasting chambers as soon as possible for the toasting of additional slices of bread. Up to the present time, many arrangements have been suggested for storing and warming toast slices after their removal from the toasting chambers, but a number of drawbacks in these devices have been encountered such as the requirement of bulky additional parts for the toaster, storage chambers where the bread slices must be stacked flat one upon the other, and arrangements which detracted from the appearance or styling of the toaster casing.

It is an object of this invention to provide a toast warming device for a toaster that will readily support a plurality of bread slices without stacking them one upon the other and which will provide uniform heat to each of the slices after they are removed from toasting chambers.

Another object of this invention is to construct a toaster with toast-warming means that requires little addition to the size of a toaster and in which the warming means when not in use can be so associated with the toaster casing as not to detract from its external appearance.

A further object of this invention is to provide in an electric toaster an auxiliary heating means and a rack for supporting a plurality of slices of bread on edge above the heating means wherein the rack and heating means may be retracted to a compact position adjacent the toaster housing.

Still another object of this invention is to provide in an electric toaster a warming device and bread supporting rack associated therewith wherein the heater of the toast-warming device is automatically energized and the rack is extended to a bread supporting position in response to manipulation of the device to its operating position.

In accordance with this invention, there is attached to a wall of a toaster housing a toast-warming device that is swingable from a vertical non-operating position to a horizontal heating position. The warming device comprises a shell enclosing an electrical resistance heating element which may be automatically energized to supply heat through perforations in the upper face of the shell when the latter is in the horizontal heating position. A bifurcated bread rack is pivoted on the wall of the housing and is swingable to a position in which its fingers or prongs extend horizontally above the heating device when the latter is in its heating position. These fingers are disposed to receive bread slices therebetween and hold the latter vertically disposed and horizontally spaced with their lower edges resting on the upper surface of the shell. Each of the bread slices thus receives sufficient heat to maintain it warm after being removed from toasting chambers within the toaster and additional slices of bread may be immediately toasted.

The foregoing and other objects are effected by our invention as will be apparent from the following description taken in connection with the accompanying drawings, forming a part of this application, in which:

Fig. 1 is a perspective view showing one end of an electric toaster having a toast heating device and toast supporting rack in their extended operating positions;

Fig. 2 is a vertical section taken on line II—II of Fig. 1 and showing in dotted lines the retracted position of the rack and heating device; and Fig. 3 is a vertical section taken on line III—III of Fig. 2 showning the details of the electrical switching arrangement for the warming device.

Referring to Fig. 1 of the drawing, there is shown an electric toaster 11 having a metal housing enclosing toasting chambers and defined in part by an inverted U-shaped wrapper 13 supported on a plastic thermally-insulating base 14. The top of the wrapper 13 is provided with a plurality of openings for access to the toasting chambers within the housing. Within the housing is a frame 16 supported by the base 14 and to which are attached electrical heaters 18 for toasting opposite faces of bread slices in the toasting chambers. Only one end of the toaster 11 is shown in the drawings. The other end of the toaster may be of any desired configuration and construction and forms no part of the present invention. Any suitable means, not shown, but well known in the art, may be used to control the movement of bread in the toasting chambers and to regulate the energization of the toasting heaters 18 during a toasting operation.

The end of the U-shaped wrapper 13 shown in the drawings is closed, at least partially, by a metal panel 20 attached thereto by any suitable means, such as screws, to form an end wall of the toaster housing. The panel 20 is provided with a large central recess 21 for receiving a toast rack 23 in a retracted position. The details and function of this toast rack 23 will be referred to hereinafter.

A toast-warming device 30 is hinged for pivotal movement about a horizontal axis near the bottom of the end panel 20 of the toaster housing. The warming device 30 comprises a dished metal member 32 and a flat perforated grid or metal plate 34 forming walls to define a shell for enclosing an electrical resistance heating element 36 of low wattage relative the toasting heaters 18 of the order of 100 watts. The heating element 36 extends opposite a large area of the inner face of the plate 34 and is supported in the warming device 30 by a plurality of ceramic electrically insulating supports 38 fastened to a reflecting metal sheet 40 located intermediate the heating element 36 and the dished member 32. The metal plate 34 forms a toast supporting surface when in a horizontal position and is provided with a plurality of ribs 42 to maintain toast supported thereon spaced from the perforations 44 in the plate 34 to permit heat to pass more readily from the heating device 30.

The panel 20 forming the end wall of the toaster housing is provided with tabs bent from the plane thereof to support a hinge pin 46. The metal plate 34 of the warming device is also provided near one edge thereof with similar tabs for supporting the warming device 30 on the hinge pin 46 so that the warming device may be swung from the horizontal toast supporting position shown in Figs. 1 and 2 to a vertical or retracted position illustrated by the dotted lines of Fig. 2, wherein the metal plate 34 extends generally parallel to the end panel 20 of the toaster housing.

The ends of the resistance element 36 are electrically connected to terminal pins 50 and 51, shown in Figs. 2 and 3, supported in insulated relationship on the edge of the reflector plate 40 near the pivot pin 46. These pins extend through openings in the metal plate 34 and are positioned to swing below and to the rear of the end panel 20 into contact with resilient electrically conducting strips 52 and 53 within the toaster housing when the warming device 30 is swung to its horizontal position. These resilient conducting strips 52 and 53 are supported in electrically insulated relationship by the frame 16 and are connected by any suitable means to a source of electrical energy for energizing the heating element 36 of the warming device 30 independently of the energization of the toasting heaters 18.

The switching arrangement for the warming device as described above is shown and described in James R. Chivers application Serial No. 632,536, filed January 4, 1957, and assigned to the assignee of the present invention.

The toast rack 23 is arranged some distance above the warming device 30 to support toast slices on edge, as indicated by dotted line in Fig. 2. This rack 23 is a bifurcated structure formed of wire and having a plurality of fingers 60 extending horizontally when in operating position for supporting toast slices therebetween in horizontally spaced relationship. The ends 62 and 63 of the wire rack pivotally support the latter for movement about a pivotal axis parallel to the hinge pin 46 by extending into holes in the sides of the recess 21 in the panel 20. The rack 23 is biased by means of a spring 65 to the extended operating position shown in the drawings and is retractable to a vertical position in the recess 21 in the panel 20. When the warming device 30 is swung up to its vertical position, the ends of the fingers 60 of the rack 23 will be engaged by the upper surface of the metal plate 34 and moved to the retracted position against the bias of the spring 65. Stops 67 are integrally attached to the rack 23 to limit the downward spring biased movement thereof relative the end panel 20 of the toaster housing by abutting the latter. The heating device 30 may be retained in its vertical non-operating position by means of a pin 70 attached to the upper or outer edge of the metal plate 34 and extending through an opening in the upper end panel 20 of the toaster housing to engage a spring friction clamp 72 or any other suitable detent means located behind this opening within the housing.

A plastic heat insulating handle 75 is attached to the lower or outer side of the toast-warming device 30 to assist in carrying the toaster 11 when the warming device 30 is in its vertical or retracted position and to provide a foot for supporting the warming device in its horizontal position on a horizontal counter surface. A fixed abutment 76 is attached to the frame 16 within the toaster housing to be engaged by a part of the warming device such as the lower end 77 of the plastic handle 75 to prevent the warming device from swinging below its horizontal position in the event the toaster is lifted from the counter while the warming device is extended.

The perforated plate 34 of the warming device 30 and the wire toast supporting rack 23 are disposed adjacent each other and are completely concealed when the warming device is in its vertical position. In this position the heating element 36 within the warming device is also maintained deenergized by the separation of the terminal pins 50 and 51 from the resilient conducting strips 52 and 53. When the warming device 30 is extended to its horizontal position the heating element 36 will automatically be energized, assuming the toaster to be connected to a power source, and the wire rack 23 will swing from its retracted position and follow the warming device until the rack reaches the illustrated horizontal position whereupon this warming arrangement is ready to receive toasted bread slices to be kept warm.

While the invention has been shown in but one form, it will be obvious to those skilled in the art that it is not so limited but is susceptible of various other changes and modifications without departing from the spirit thereof.

What is claimed is:

1. A toaster comprising a housing, a toast-warming structure movably supported by said housing, said structure comprising a heating element for supplying heat from one face of said structure to toast to keep it warm, said structure being movable to a first position adjacent said housing and to a second position in which it extends from said housing with said face exposed upwardly, a toast support carried by said toaster for movement relative said housing to a position in which said support extends above said structure when the latter is in said extended position, and switch means for automatically energizing said heating element in response to movement of said structure from said first position to said second position.

2. A toaster comprising a housing, a toast-warming structure movably supported by said housing, said structure comprising a toast-supporting grid, said structure being movable between a first position in which said grid is disposed adjacent said housing and a second position in which said grid extends horizontally from said housing to provide a toast-supporting surface, an electrical resistance heating element supported beneath said grid when the latter is in said horizontally extending position, means for energizing said heating element when said structure is in said second position, a bread support mounted on said toaster for movement relative said structure, and means for supporting said bread support with the latter extending above said grid when the toast-warming structure is in said second position, said bread support being retractable to a position adjacent said housing.

3. A toaster comprising a housing, a movable toast-warming structure supported by said housing and having walls defining an enclosure, an electrical resistance heating element supported in said enclosure and extending opposite the inner face of one of said walls, said structure being movable relative said housing to a first position in which said one wall is substantially concealed from view and to a second position in which said one wall extends horizontally from said housing to provide a toast supporting surface, a bread support movably mounted on said housing and disposed to extend above said one wall when the latter is in its horizontal position, said bread support being retractable to a position concealed by said structure when the latter is in its first position.

4. A toaster comprising a housing, a movable toast-warming structure supported by said housing for movement relative thereto, said structure comprising walls defining an enclosure, an electrical resistance heating element supported in said enclosure and extending opposite a large area of one of said walls, said structure being movable relative said housing to a first position in which said one wall is disposed adjacent the housing and substantially concealed from view by the toaster housing and other walls of said structure, said structure being movable to an operating position in which said one wall extends generally horizontally from said housing, a bread rack supported on said toaster, said bread rack being movable to a retracted position adjacent said housing and to a second position in which it extends above said one wall when said structure is in said second position, said bread rack including means for supporting toasted bread slices in spaced relationship above said structure for receiving heat therefrom when the rack is in said second position, said bread rack being movable between said retracted and toast supporting positions in response to movement of said toast-warming structure.

5. A toaster comprising a housing, a toast-warming device pivotally supported by said housing, said device including a grid, an electrical resistance heater supported by said device and extending along one face of said grid, said device being movable relative said housing to a position in which said grid is disposed adjacent said housing and to a second position in which said grid extends generally horizontally from said housing, said electrical resistance heater being disposed along the underside of said grid when the latter is in said second position and a bread rack supported on the toaster for movement relative said grid, said rack including means for supporting a plurality of toast slices above said grid when the latter is in its second position, said rack being movable to a first position for supporting toast slices above said grid and to a retracted position adjacent said housing.

6. A toaster comprising a housing having a plurality of sides, a toast-warming structure having walls defining a compartment, an electrical resistance heater in said compartment, said structure being pivotally supported for movement relative said housing to a position in which one wall thereof extends substantially horizontally from said housing, said one wall being perforate to pass heat to toast supported thereabove and a toast supporting rack pivotally supported by said housing, said rack having a plurality of fingers and being movable to a position in which said fingers extend above said warming structure when the latter is in its horizontal position, said structure being movable to a position with said one wall disposed substantially vertically adjacent one side of said housing, said bread rack being retractable to a position intermediate said one side of the housing and said one wall when the latter is in its vertical position.

7. In a toaster, the combination of a casing having a wall, a warming structure for toasted bread slices including an electrically heated grid for radiating heat, means for movably supporting the warming structure upon said casing, said warming structure being movable from one position wherein the grid is adjacent the wall of the casing to a second position wherein one grid extends generally horizontally from the casing for the support of the bread slices, a rack movably supported by the casing and disposed intermediate the grid and said casing wall in said one position of the warming structure, said rack being spaced above the grid for positioning bread slices thereon in the second position of the warming structure, means responsive to movement of the warming structure for actuating the rack and switching means responsive to movement of the warming structure to its second position for energizing the grid.

References Cited in the file of this patent

UNITED STATES PATENTS

| | | |
|---|---|---|
| 1,669,318 | Baad | May 3, 1928 |
| 1,832,831 | Ginder | Nov. 17, 1931 |
| 2,004,937 | Fletcher | June 18, 1935 |